US012184601B1

(12) United States Patent
Liang et al.

(10) Patent No.: US 12,184,601 B1
(45) Date of Patent: Dec. 31, 2024

(54) ORGANIZING PRODUCT-RELATED EMAILS

(71) Applicant: Google LLC, Mountain View, CA (US)

(72) Inventors: Chenmin Liang, Fremont, CA (US); Rachel Elizabeth Derkits-Gelman, Los Altos, CA (US); Xiaonan Zhang, Los Altos, CA (US); Jiye Huang, Santa Clara, CA (US); Dirk John Stoop, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/986,372

(22) Filed: Nov. 14, 2022

Related U.S. Application Data

(60) Provisional application No. 63/278,723, filed on Nov. 12, 2021.

(51) Int. Cl.
*H04L 51/42* (2022.01)
*H04L 51/08* (2022.01)

(52) U.S. Cl.
CPC .............. *H04L 51/42* (2022.05); *H04L 51/08* (2013.01)

(58) Field of Classification Search
CPC ....... H04L 51/42; H04L 51/08; H04L 51/234; H04L 51/226; H04L 41/026
USPC ........................................................ 709/206
See application file for complete search history.

(56) References Cited

U.S. PATENT DOCUMENTS

| | | | | |
|---|---|---|---|---|
| 9,049,348 | B1* | 6/2015 | Foster | H04N 7/183 |
| 9,727,901 | B2* | 8/2017 | Li | G06F 16/583 |
| 11,265,274 | B1* | 3/2022 | Anvaripour | H04L 51/18 |
| 11,743,213 | B2* | 8/2023 | Dalonzo | H04L 51/56 |
| | | | | 709/206 |
| 2004/0230511 | A1* | 11/2004 | Kannan | G06Q 40/00 |
| | | | | 705/35 |
| 2010/0257102 | A1* | 10/2010 | Perlman | G06Q 30/06 |
| | | | | 705/44 |
| 2011/0219403 | A1* | 9/2011 | Nesamoney | H04N 7/025 |
| | | | | 725/34 |
| 2014/0372951 | A1* | 12/2014 | Li | G06F 16/5866 |
| | | | | 715/835 |
| 2015/0074207 | A1* | 3/2015 | Banatwala | G06F 3/04842 |
| | | | | 709/206 |
| 2018/0232441 | A1* | 8/2018 | Lin | G06N 20/00 |
| 2020/0007482 | A1* | 1/2020 | Bastide | G06F 16/345 |

(Continued)

*Primary Examiner* — Sargon N Nano
(74) *Attorney, Agent, or Firm* — DORITY & MANNING P.A.

(57) ABSTRACT

A computing system and method that can be used for organizing product-related emails, wherein product-related emails can pertain to products such as objects/items or otherwise pertain to entities such as experiences, subscriptions, services etc. In particular, example aspects of the present disclosure involve computing systems and computer-implemented methods for organizing product-related emails based on historical user data and characteristics extracted from the product-related emails. The systems and methods of the present disclosure allow for use of email that more conveniently conveys pertinent information contained in product-related emails through presentation of various information predicted as more valuable to a user and methods to more easily find product-related emails associated with a user's particular desires.

11 Claims, 7 Drawing Sheets

(56) References Cited

U.S. PATENT DOCUMENTS

| | | | |
|---|---|---|---|
| 2022/0148059 A1* | 5/2022 | Faricy | G06Q 30/0641 |
| 2023/0031718 A1* | 2/2023 | Popelka | G06Q 10/0633 |

* cited by examiner

ORGANIZING PRODUCT-RELATED EMAILS

RELATED APPLICATIONS

This application claims priority to and the benefit of U.S. Provisional Patent Application No. 63/278,723, which is hereby incorporated by reference in its entirety.

FIELD

The present disclosure relates generally to product-related emails. More particularly, the present disclosure relates to improved features relating to organizing product-related emails.

BACKGROUND

Electronic communication is a method of exchanging digital messages from a sender to one or more recipients. Electronic communication may operate across the Internet or other computer networks. Some examples of electronic communicating may include electronic mail, commonly called email or e-mail, instant messaging, Short Messaging Service messages (SMS), and Multimedia Messaging Service (MMS). Electronic communication has become one of the main forms of communication for many people and organizations. However, interactions associated with electronic communication can be difficult to manage due to the overwhelming quantity of potential electronic communication.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for organizing product-related emails. The method comprises a computing system receiving a plurality of product-related emails. The method comprises the computing system scoring the product-related emails based at least in part on historical user data. The method comprises the computing system extracting one or more images from at least one particular product-related email. The at least one particular product-related email is selected based at least in part on the score. The method comprises the computing system displaying the one or more images in at least one email preview associated with the at least one particular product-related email.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to electronic mail ("email"), such as systems and methods for organizing product-related emails, such as emails that pertain to products such as objects/items or otherwise pertain to products such as experiences, subscriptions, services, etc. In particular, example aspects of the present disclosure involve computing systems and computer-implemented methods for organizing product-related emails based on historical user data and/or characteristics extracted from the product-related emails. The systems and methods of the present disclosure allow for user interactions with email that more conveniently convey pertinent information contained in product-related emails. In particular, the present disclosure describes systems and methods that present various information predicted as more valuable to a user and that provide user interfaces that enable a user to more easily find product-related emails associated with the user's particular desires.

More particularly, some example systems and methods of the present disclosure display one or more images in an email preview for a user to easily view while scrolling through their email feed. For example, only a select number of email previews can contain images so as to not overwhelm a user with images. As a particular example, the select number of email previews can be determined by a ranking or scoring of the product-related emails. Thus, by providing one or more images in an email preview, the user can more efficiently browse through a curated preview of image content within a number of emails before selecting emails that the user would prefer to review in more detail.

Additionally, or alternatively to the images within the email preview, some example systems and methods of the present disclosure can also streamline the process of a user finding emails directed to particular interests by generating representations of clusters of emails based on detected characteristics. The generalized representations can include user interface elements (e.g., "chips") that a user can interact with. As an example, example chips can relate to particular senders, topics, and/or expiration dates. The user can interact with the chips to facilitate a more efficient and rewarding user experience. For example, a user can quickly navigate to a certain cluster of emails that have one or more desired characteristics (e.g., by selecting a chip that corresponds to the desired characteristics).

Traditionally, a user receives a plurality of product-related emails that may have textual previews associated with them. By contrast, embodiments of the present disclosure provide for ways for a user to more easily and effectively view product-related emails, thereby enabling the user to ascertain which emails are of importance or interest.

In some implementations, a user can view one or more representative images in an email preview prior to opening the email. In particular, a computing system can receive a plurality of product-related emails. The product-related emails can be scored such that each product-related email has a score associated with it. For example, the product-related emails can be scored based at least in part on historical user data. In particular, the product-related emails can be scored based at least in part on the predicted value of the email. For instance, a machine-learned model can generate a score based on historical user data related to the likelihood of a user being interested in the products associated with the product-related emails. As another example, product-related emails containing duplicated products can be determined and only one of the emails can have a higher score while other emails with duplicated products can have deflated scores to reflect a score indicating that a user would not be interested in duplicate emails.

In some implementations, a computing system can score one or more images within a product-related email such that each image within a product-related email has a score associated with it. For example, the product-related email images can be scored based at least in part on historical user data. As another example, the product-related email images can be scored based at least in part on semantic analysis (e.g., semantic analysis of text such as product-related email subject lines) in combination with image analysis of the one or more images within a product-related email. In particular, the product-related email images can be scored based at least in part on the predicted value of the image. For instance, a machine-learned model can generate a score based on historical user data related to the likelihood of a user being interested in the products associated with the product-related email image. Even more particularly, one or more representative images can be selected based at least in part on the score associated with the one or more images within a product-related email.

In some implementations, one or more images can be extracted from at least one particular product-related email. Even more particularly, the at least one particular product-related email can be selected based at least in part on the score associated with each product-related email. For example, the at least one particular product-related email can be selected based on a high score (e.g., higher than a predetermined threshold, relative to other surrounding emails, etc.) In particular, the one or more images extracted from the at least one particular product-related email can be displayed in at least one email preview. Even more particularly, the at least one email preview can be associated with the corresponding at least one particular product-related email.

In some implementations, the one or more images extracted from the at least one particular product-related email can be adjusted to align with particular parameterizations. In particular, the one or more images can be adjusted to align with particular parameterizations prior to display. For example, the particular parameterization can include a 1:1 image ratio. As another example, the particular parameterization can include a 4:5 image ratio. As yet another example, the particular parameterization can include a 1.91:1 image ratio. As a particular example, the one or more images can be adjusted to a desired image ratio (e.g., cropped) prior to display. In particular, no preference can be given to images in product-related emails that align to the particular parameterizations prior to editing. In particular, within a single email preview, the images can be all the same image ratio. Even more particularly, within multiple email previews, the images can have differing image ratios. As another example, the particular parameterization can include a minimum and maximum number of displayed images. In particular, between 1 and 15 images, preferably between 3 and 10, can be displayed in a single email preview.

In some implementations, extracting one or more images from a particular product-related email can include automatically extracting the one or more images. In particular, additional associated information can be extracted along with the one or more images. For example, the name of a product, the price, dates of sale, or a short description of the product can be extracted and surfaced alongside the associated one or more images. Even more particularly, in some instances the one or more images can be associated with an image destination link (e.g., URL) such that a user can interact with the one or more images and be taken directly to a web page associated with the product associated with the image. Even more particularly, a user can interact with a non-image part of the email preview to open the email body.

In some implementations, extracting one or more images from a particular product-related email can include extracting the one or more images based on manual annotation. For example, senders of the product-related emails can manually annotate images and information associated with the images such that the images and associated information are already prepared for extraction prior to the user receiving the product-related email.

In some implementations, displaying one or more images in an email preview associated with the at least one particular product-related email can include displaying the same one or more images in the same at least one email preview associated with the same at least one particular product-related email within a single email visit. For example, as a user views the plurality of emails, email previews may remain unchanged while the user is viewing the emails so as, for example, to facilitate efficiency of return navigation upon a later session.

In some implementations, displaying one or more images in an email preview associated with the at least one particular product-related email can include displaying the same one or more images in the same at least one email preview associated with the same at least one particular product-related email within a period of time. For example, a period of time can be predetermined (e.g., a week) and email previews may remain unchanged during the predetermined period of time (e.g., email previews can be held static for a week). After the predetermined period of time, the computing system can generate an updated scoring/ranking of the plurality of product-related emails such that particular product-related emails based on the updated scoring/ranking of the plurality of product-related emails can display one or more images in associated email previews.

In some implementations, displaying one or more images in an email preview associated with the at least one particular product-related email can include displaying the same one or more images in the same at least one email preview associated with the same at least one particular product-related email indefinitely. For example, once a particular email has images displayed in a preview, the particular email will always have the same images displayed.

In some implementations, displaying one or more images in an email preview associated with the at least one particular product-related email can be based at least in part on image quality. For example, prior to an image being displayed in an email preview, the image must meet an image quality guideline.

In some implementations, displaying one or more images in an email preview associated with the at least one particular product-related email can be based at least in part on image display density. In particular, display density can be associated with a sender of product-related emails. For example, a particular sender can have density cap associated with them (e.g., up to 1 email preview containing images per sender per day). In particular, display density can be associated with the quantity of emails. For example, a particular percentage of emails can include an email preview containing images. Even more particularly, the designated particular percentage of emails can change based on user preference. In particular, user selected display density can impact whether email previews contain images. For example, if a user selects a more dense or more compact view of the plurality of product-related emails, the computing system can remove or not include any images in email previews.

In some implementations, a plurality of product-related emails can be received. In particular, characteristics of the plurality of product-related emails can be extracted. Even more particularly, the one or more product-related emails can be clustered. For example, the one or more product-related emails can be clustered based at least in part on the extracted characteristics associated with the plurality of product-related emails. In particular, chips associated with the clusters of the one or more product-related emails can be surfaced. Even more particularly, the one or more product-related emails associated with the clusters can be displayed in response to interaction with the chips. For example, the one or more product-related emails associated with the clusters can be displayed in reverse chronological order from most recent date of receipt.

In some implementations, clustering one or more product-related emails based at least in part on characteristics associated with the one or more product-related emails can include clustering one or more product-related emails based on a sender, expiring deals, personalization, topic, etc.

In some implementations, surfacing chips associated with the clusters of the one or more product-related emails can include surfacing chips aligning with chip parameters. For instance, chip parameters can include a limited number of chips (e.g., between 2 and 10 chips, between 4 and 7 chips, etc.).

In some implementations, surfacing chips associated with the clusters of the one or more product-related emails can include surfacing chips consistently within an email visit. For example, as a user views the plurality of emails, surfaced chips may remain unchanged while the user is viewing the emails.

In some implementations, surfacing chips associated with the clusters of the one or more product-related emails can include surfacing chips consistently within a period of time. For example, a period of time can be predetermined (e.g., a week) and surfaced chips may remain unchanged during the predetermined period of time (e.g., surfaced chips can not be maintained for a week).

In some implementations, surfacing chips associated with the clusters of the one or more product-related emails can include surfacing chips consistently indefinitely. For example, once particular chips are surfaced, the particular chips will always be surfaced.

In some implementations, surfacing chips associated with the clusters of the one or more product-related emails can be based at least in part on newness or recency of the one or more product-related emails associated with the associated cluster. For example, chips associated with clusters of emails that are the most recent can be surfaced.

In some implementations, surfacing chips associated with the clusters of the one or more product-related emails can be based at least in part on a sent date of unopened product-related emails associated with the associated cluster. For example, chips associated with clusters of emails with the most recent unopened emails can be surfaced.

In some implementations, the product-related emails can be scored. In particular, the characteristics of the product-related emails can be extracted. For example, the characteristics of the product-related emails can be extracted based at least in part on the score (e.g., extract characteristics of products with a score higher than a threshold or a score high relative to surrounding emails). Even more particularly, the chips can be surfaced based at least in part on the extracted characteristics. For example, chips can be surfaced associated with an extracted characteristic (e.g., sender, topic, etc.) which has a high score based on user history. In particular, the order of the surfaced chips can be based at least in part on the score related to the associated characteristics of the surfaced chips.

Thus, the present disclosure provides a computing system and method that can be used to organize product-related emails, wherein product-related emails can pertain to products such as objects/items or otherwise pertain to products such as experiences, subscriptions, services, entities, etc. In particular, example aspects of the present disclosure involve computing systems and computer-implemented methods for organizing product-related emails based on historical user data and characteristics extracted from the product-related emails. More particularly, example aspects of the present disclosure allow for use of email that more conveniently conveys pertinent information contained in product-related emails through presentation of various information predicted as more valuable to a user and methods to more easily find product-related emails associated with a user's particular desires.

The systems and methods of the present disclosure provide a number of technical effects and benefits. As one example technical effect, the proposed techniques are able to provide users with a helpful experience while viewing their emails. In particular, the email organization system enables users to not only receive product-related emails but to actually engage with them in a meaningful way. Thus, by actually allowing users to engage with their product-related emails, the email organization system can save prevent wasted computational resources (e.g., processor usage, memory usage, network bandwidth, etc.) that is caused by an ever increasing number of unopened and unused product-related emails. Furthermore, a user can travel directly to a web browser associated with the product that they are interested in without sifting through a plurality of incorrect product-related emails, thereby further saving computational resources.

With reference now to the Figures, example embodiments of the present disclosure will be discussed in further detail.

Example Devices and Systems

Figure 1:
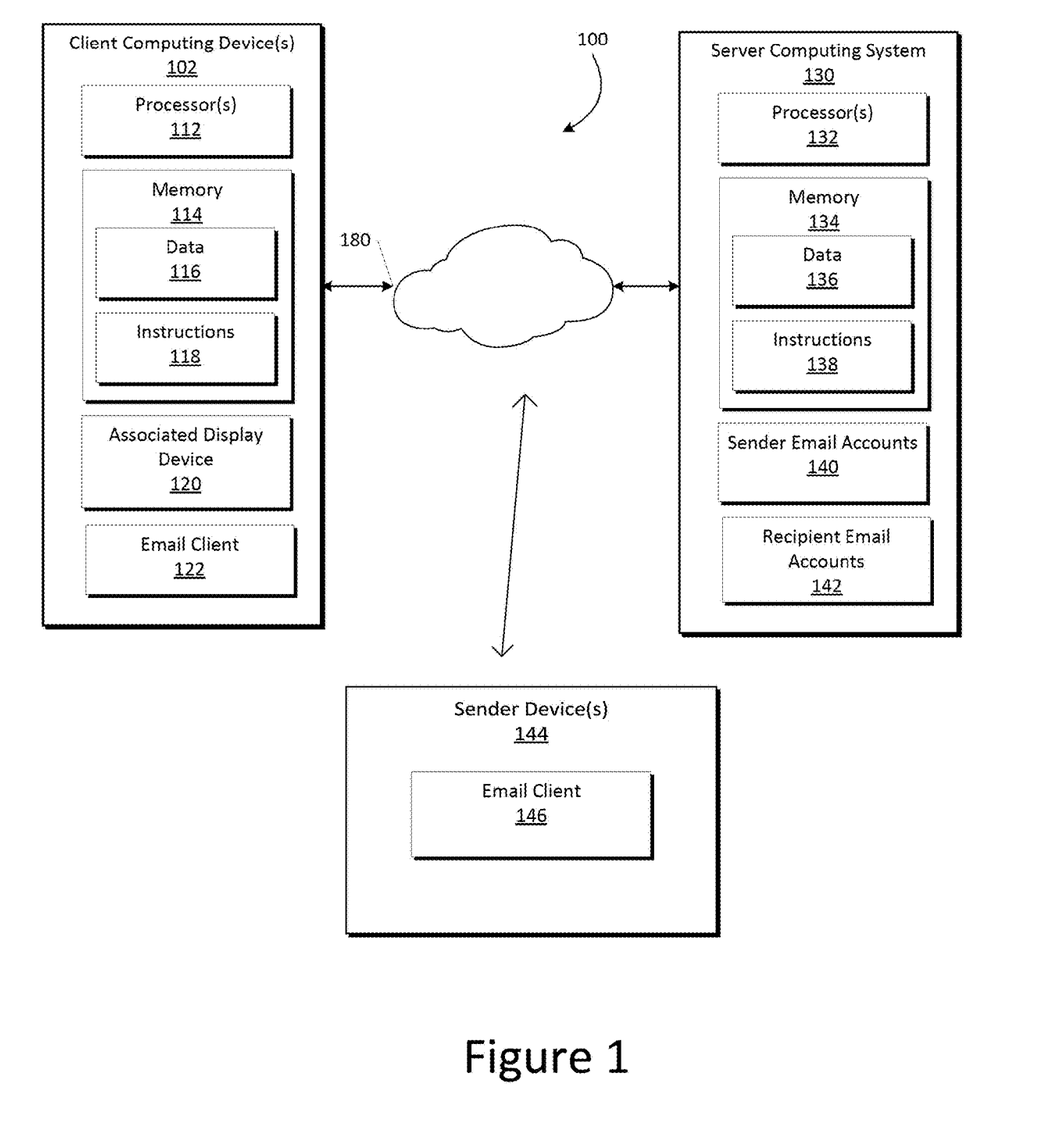
FIG. 1 depicts a block diagram of example computing systems according to example embodiments of the present disclosure.

FIG. 1 depicts an example client-server environment 100 according to example embodiments of the present disclosure. The client-server environment 100 includes a client computing device 102 and a server computing system 130 that are connected by and communicate through a network 180. Although a single client computing device 102 is depicted, any number of client computing devices 102 can be included in the client-server environment 100 and connect to server computing system 130 over a network 180.

In some example embodiments, the client computing device 102 can be any suitable device, including, but not limited to, a smartphone, a tablet, a laptop, a desktop computer, or any other computer device that is configured such that it can allow a user to participate in a video conference. The client computing device 102 can include one or more processor(s) 112, memory 114, an associated display device 120, and an email client 122.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing system 130 (e.g., one or more video conferencing applications 122, etc.). The client computing device 102 can implement the instructions to execute aspects of the present disclosure, including directing communications with server computing system 130, providing a video conferencing application 122 and/or video stream to a user, processing requests from users for execution of a multi-interaction display, and determining and providing data indicative of the current state of the interaction display.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing device 102 during a video conference or transmitted to the server computing system 130.

The sender device 144 and client computing device 102 can be operated by senders and recipients respectively. The sender device 144 and client computing device 102 can each include an email client module 146 and 122 respectively. The email client modules 146 and 122 on the sender device 144 and client computing device 102 can interact with web servers or other computing devices connected to the network 180, including the server computing system 130. The email client module 146 and 122 may be a web-based email client module accessible by a browser application or another suitable application for interacting with web page files. The email client module 146 and 122 may also comprise an email software application residing and executing on the sender device 144 or client computing device 102. As described below certain functions will be described in the context of the sender email client module 122 and other functions in the context of the client computing device email client module 146.

In accordance with some example embodiments, the server computing system 130 can include one or more processor(s) 132, memory 134, a sender email account 140, and a recipient email account 142. The memory 134 can store information accessible by the one or more processor(s) 132, including instructions 138 that can be executed by processor(s) and data 136.

The server computing system 130 can be in communication with one or more client computing device(s) 102 or one or more sender device(s) 144 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can deliver email messages between sender email accounts 140 and recipient email accounts 142. As understood in the art, the delivery of an email message between a sender and a recipient may involve more than one server computing system 130. For example, an email message may first be sent to a first server computing system hosting the sender's email account and then routed to a second server computing system hosting the recipient's email account. The distinction between sender email accounts 140 and recipient email accounts 142 is made for ease of reference purposes only and unless specified otherwise, features and functions associated with one email account type are considered to be shared by both email account types.

It will be appreciated that the network connections shown in FIG. 1 are one example and other means of establishing a communications link between the network devices 102, 130, and 144 can be used. Moreover, those having ordinary skill in the art and having the benefit of the present disclosure will appreciate that the sender device 144 and the client computing device 102 illustrated in FIG. 1 can have any of several other suitable computer system configurations.

Example Model Arrangements

Figure 2:
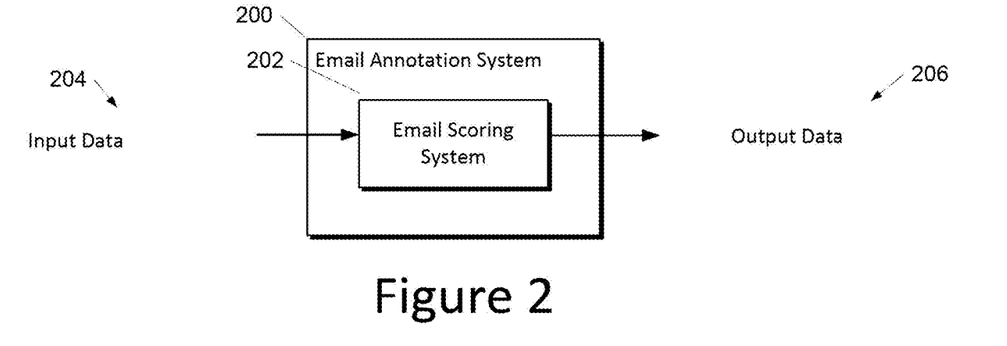
FIG. 2 depicts a representation of example components of an email annotation system incorporating machine-learning components according to example embodiments of the present disclosure.

FIG. 2 depicts a block diagram of an example generalized representation model 200 according to example embodiments of the present disclosure. In some implementations, the email annotation system model 200 is trained to receive a set of input data 204 descriptive of raw user data and, as a result of receipt of the input data 204, provide output data 206 that includes an email scoring or ranking presented in the raw user data. Thus, in some implementations, the email annotation system model 200 can include an email scoring system model 202 that is operable to generate a prediction of what score is associated with the content of the emails.

In particular, email scoring system model 202 can leverage the input data 204 to determine email scoring based on input data 204. For instance, the email scoring system model 202 can predict the score associated with an email based on the input data 204.

In some implementations, the email scoring system model 202 can be a machine-learned image classification model. For example, the machine-learned image classification model can be used to detect the score or ranking of emails (e.g., by leveraging features such as semantic analysis (discriminative, generative, cognitive, etc.) by training on historical user data. As another example, the machine-learned email annotation system model can be used to detect the scores or ranking associated with emails by training on data generalized from a plurality of users. As one example, a machine-learned email annotation model can be trained to classify an email received by a user into one or more of a plurality of different rankings which respectively correspond to a plurality of different annotation classifications. As one example, the classification model can be trained using a supervised learning approach on a training dataset that includes a plurality of training data pairs. Each pair of training data can include an image of a person, object, or scene and a ground truth label that indicates a ground truth interest level a user has relative to the person, object, or scene (e.g., click rate). For example, the machine-learned email annotation system model can be used to detect the annotation classification of the email contents (e.g., identified objects, identified people, etc.) by training on historical user data. As another example, the machine-learned annotation system model can be used to detect the email rankings of the user by training on data generalized from a plurality of users.

In some implementations, the email scoring system model 202 can be a machine-learned textual classification model. For example, the machine-learned textual classification model can be used to detect the email ranking or scores of the user (e.g., by leveraging features such as textual analysis (Naive Bayes, support vector machines, deep learning, etc.)) by training on historical user data. As another example, the machine-learned textual classification model can be used to detect the email ranking or scores of the user by training on data generalized from a plurality of users. As one example, a machine-learned textual classification model can be trained to classify text input by a user into one or more of a plurality of different classes which respectively correspond to a plurality of different email annotations much like the machine-learned image classification model described above.

The email annotation system model 200 can leverage the output of the email scoring system model 202 to generate an email annotation prediction of the associated email (e.g., whether or not to display annotation and what annotation to display in an email preview). Even more particularly, the email annotation system model 200 can leverage the input data 204 in combination with the output of the email scoring system model 202 to generate the output data 206 which could include the representation of an email annotation or lack thereof to be displayed associated with the particular email.

Figure 3:
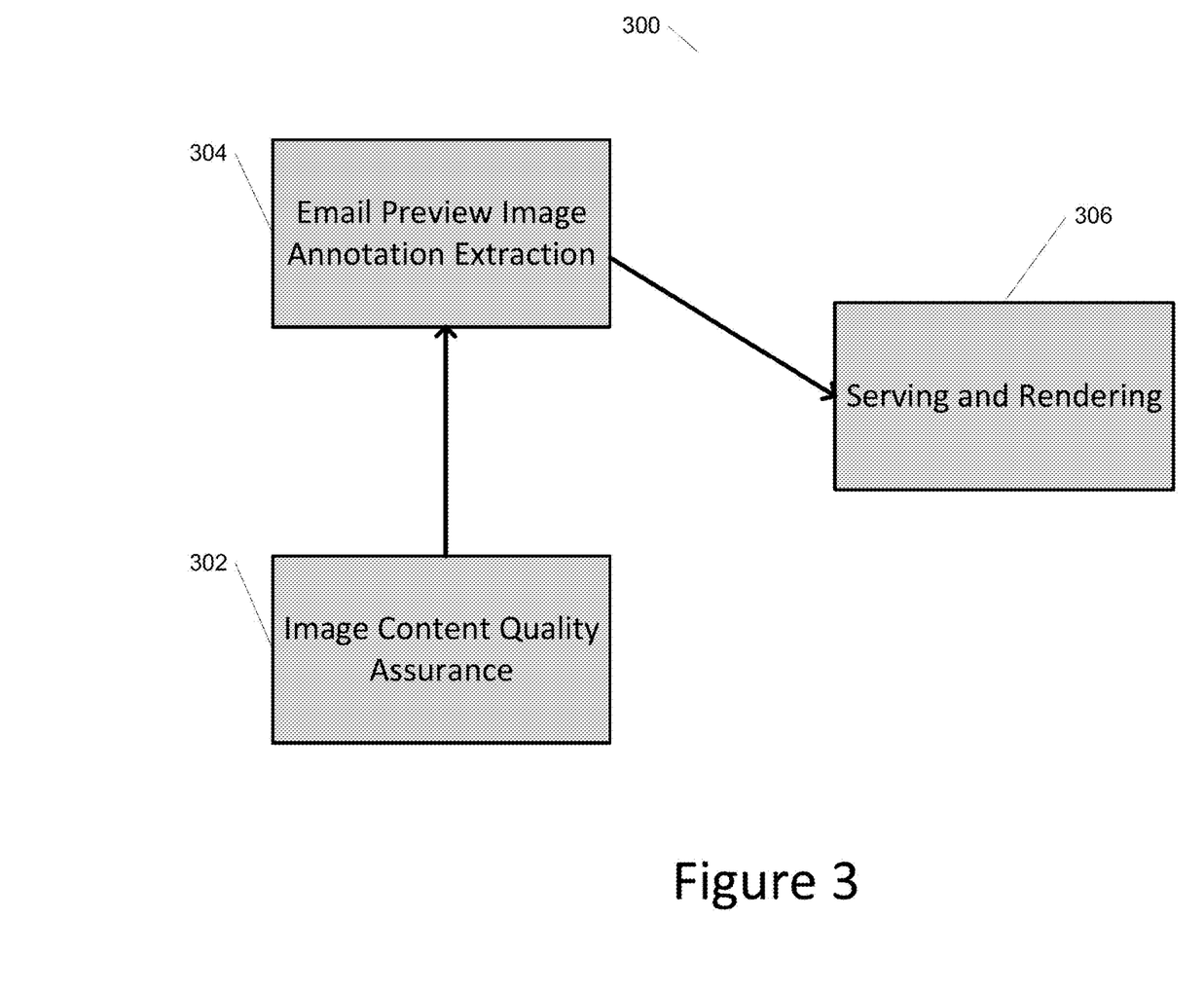
FIG. 3 depicts a representation of example components of an email preview image annotation system according to example embodiments of the present disclosure.

FIG. 3 depicts a representation of example components of an email image preview annotation system according to example embodiments of the present disclosure. In some implementations, potential images (e.g., images contained in product-related emails) can go through an image content quality assurance system 302. In particular, the image content quality assurance system 302 can conduct quality checks both online and offline. In order to prevent email marketers from using the same image link but changing the underlying raw image, an image fingerprint can be precalculated.

In some implementations, when conducting quality checks online an image quality annotation service can leverage persistent storage to complete a multi-step process. For example, image content can be crawled through to obtain an image content quality score. Furthermore, sampled human evaluation can be conducted as well. If an image meets the quality guidelines, the image link (e.g., URL) can be exported from the image content quality assurance system 302 to an email preview image annotation extraction system 304 while images that do not meet the quality guidelines can be filtered out in both live and batch style updates.

In some implementations, the image content quality assurance system 302 can determine the cropping and resizing parameters. In particular, the image content quality assurance system 302 can generate an image proxy link with cropping and resizing options as well as style of image which can render at the client side. The image content quality assurance system 302 can further crawl the image proxy link and obtain image content raw bytes for cropped and resized images and calculate an image fingerprint based on the cropped and resized image. The image proxy link as well as the calculated image fingerprint can be fetched and passed down to the delivery path and stored such that a client and fetch the image proxy link and its related fingerprint. In particular, the client can download the raw image from the image proxy link and verify the fingerprint to avoid showing images with changed raw bytes.

In some implementations, the email preview image annotation extraction system 304 can create the product associated email preview image on the email delivery path. In particular, an email can be annotated with carousel card information (e.g., product image, headline, price, discount, URL, external clickable URL, etc.) In particular, a manual annotation feature computer can fetch manual annotations (plus enhanced annotations such as quality score) while a separate annotation feature computer can fetch automatic annotations. Even more particularly, the annotations can be combined into an annotation attribute. The same image content quality standards can be applied to manual and automatic annotations.

In some implementations, the serving and rendering system 306 can access the annotation attributes generated by the email preview image annotation extraction system 304. In particular, upon accessing the annotation attributes, the serving and rendering system 306 can apply the annotations to the email preview message. The serving and rendering system 306 can return a set of information to the client such as card type (e.g., adjusted image ratio), image content fingerprint. Optionally, the serving and rendering system 306 can return the title or price of the associated products.

Example Applications

Figure 4:
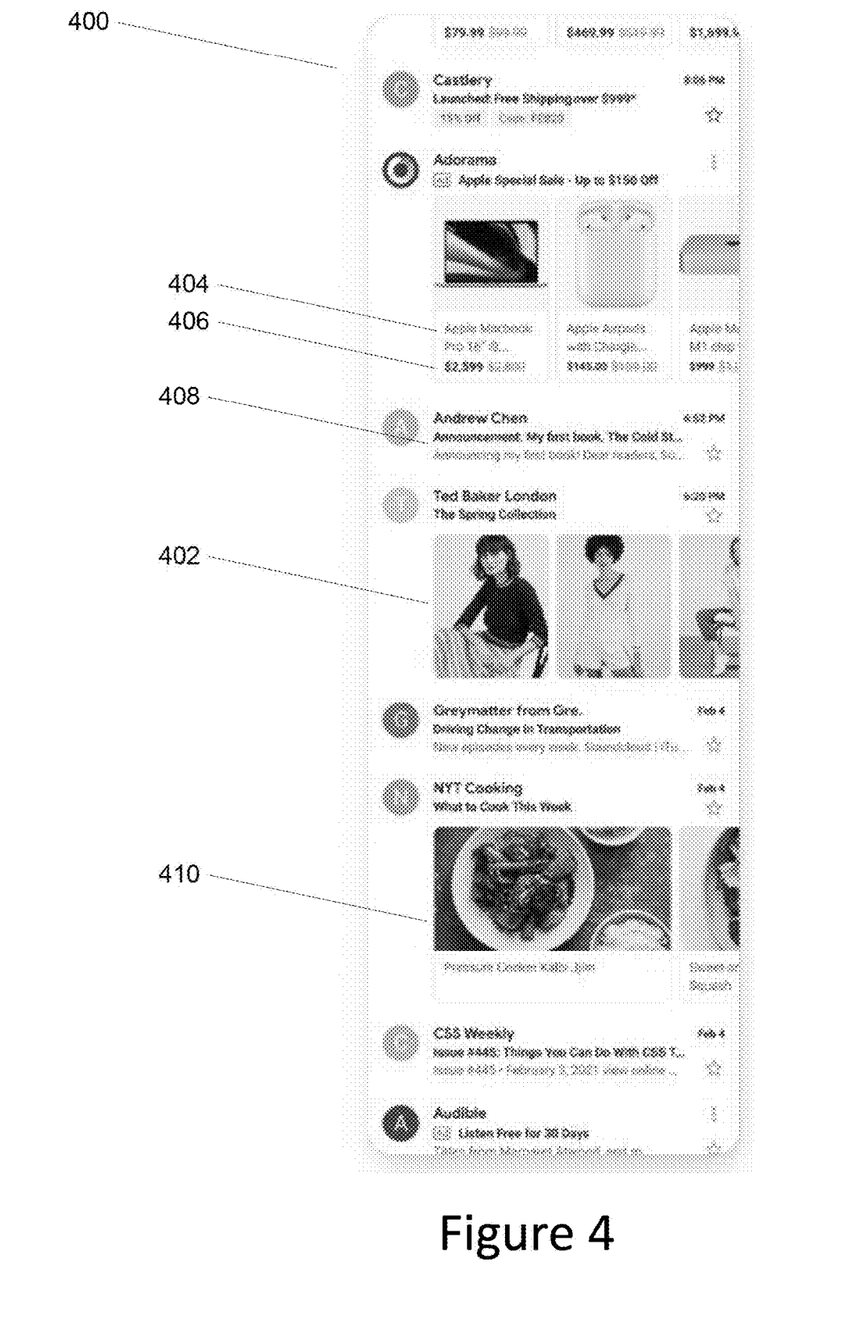
FIG. 4 depicts an example graphical user interface of email preview images according to example embodiments of the present disclosure.

FIG. 4 illustrates an example graphical user interface of email preview containing images according to example embodiments of the present disclosure. FIG. 4 shows an exemplary implementation of an email application 400 wherein the email previews can include product images 402 associated with the content contained in the emails. In some implementations, the images 402 can be horizontally scrollable. For example, the images 402 can be presented using a carousel feature in which the images 402 are scrollable. The images 402 can be scrolled automatically or based on user-input (e.g., touch input). The images 402 can optionally be replaced with additional images when scrolled.

In some implementations, a name of a product 404 can be extracted from the associated email and displayed on a label associated with a product image 402. In particular, a price or price difference 406 associated with the product can be displayed on a label associated with a product image 402. In particular, a title 410 associated with the product can be displayed on a label associated with a product image 402.

Figure 5:
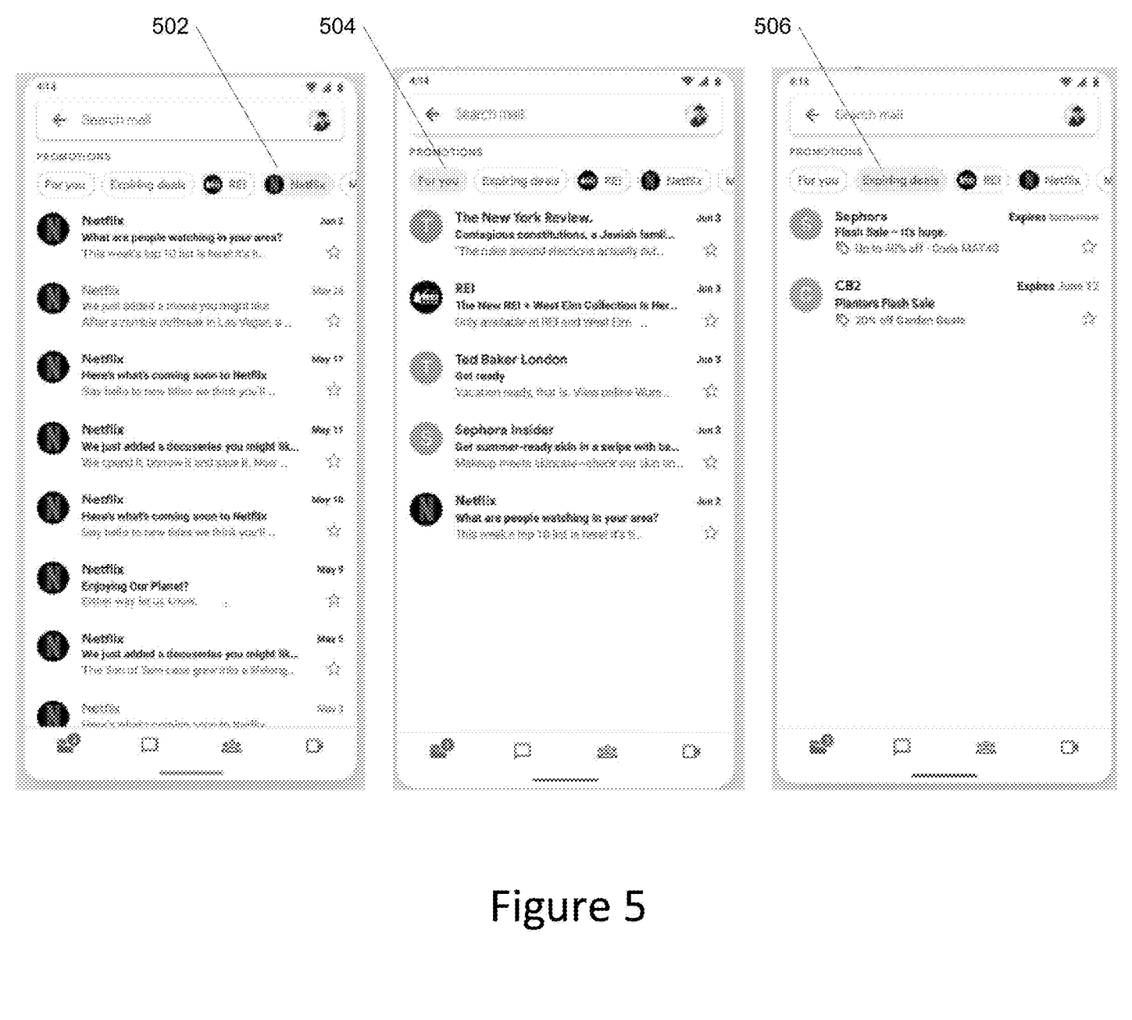
FIG. 5 depicts an example graphical user interface of email filter chips according to example embodiments of the present disclosure.

FIG. 5 illustrates an example graphical user interface of chips associated with particular clusters of emails according to example embodiments of the present disclosure. FIG. 5 shows an exemplary implementation of an email application 400 wherein the emails can be organized by chips associated with particular clusters of emails associated with extracted characteristics.

In some implementations, the chips can be a sender chip 502 such that a user can interact with the user chip 502 to view only product-related emails from a particular sender. In some implementations, the chips can be a personalized chip 504 such that only emails predicted as the most important to a user (e.g., based on historical user data) can be viewed. For instance, the product-related emails can be ranked or scored and only ranks or scores above a predetermined threshold can be clustered in the cluster associated with the user personalized chip 504. In some implementations, the chips can be an expiring deals chip 506 such that product-related emails containing discounts or other time sensitive offers are displayed. In particular, only product-related emails containing discounts or other time sensitive offers that will expire within a predetermined amount of time can be clustered with the cluster associated with the expiring deals chip 506. In some implementations, the chips can be horizontally scrollable. For example, the chips can be presented using a carousel feature in which the chips are scrollable. The chips can be scrolled automatically or based on user-input (e.g., touch input). The chips can optionally be replaced with additional images when scrolled.

Example Methods

Figure 6:
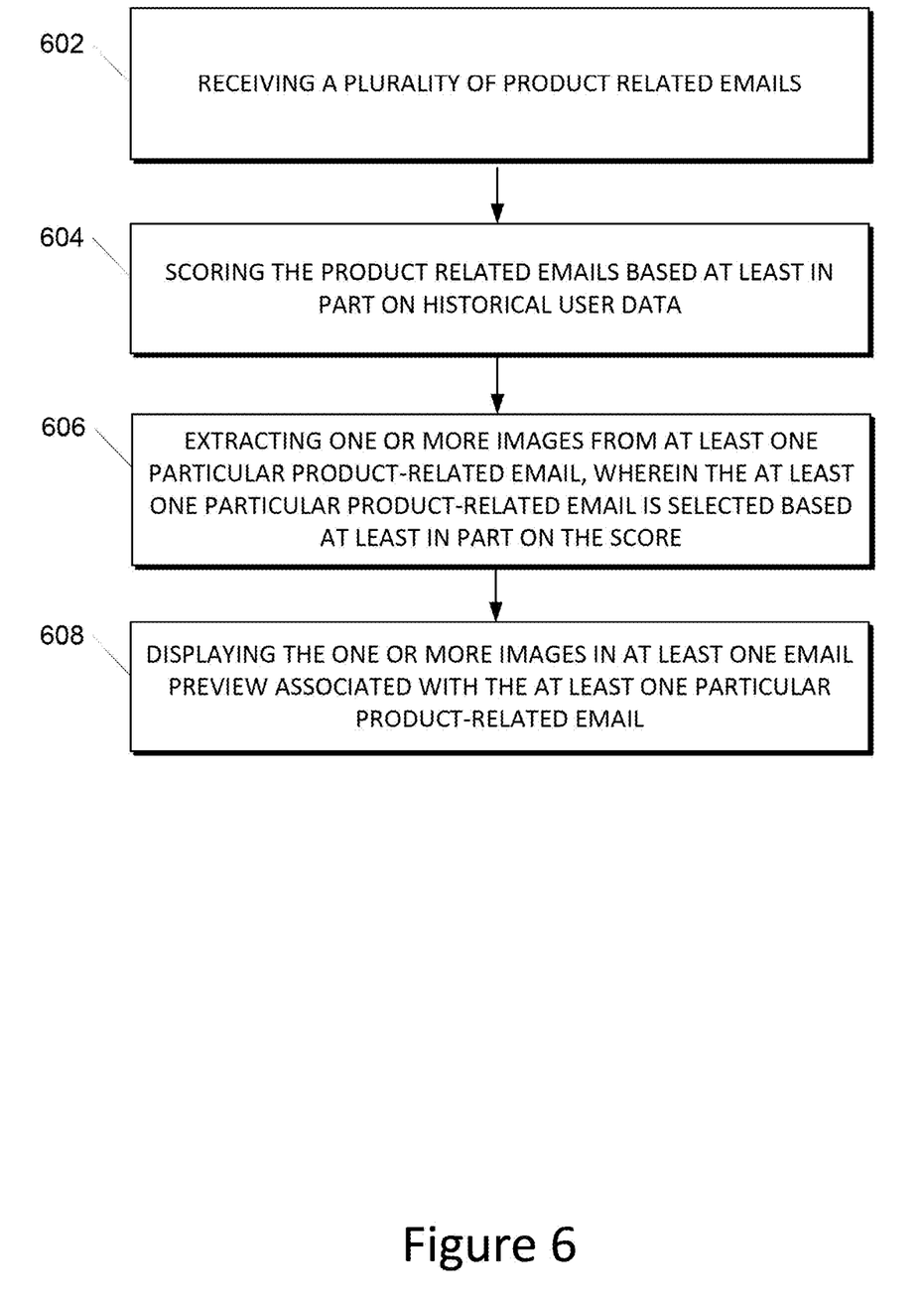
FIG. 6 depicts a flow diagram for providing images in email previews according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can receive a plurality of product-related emails.

At 604, the computing system can score the product-related emails. In particular, the computing system can score the product-related emails based at least in part on historical user data.

At 606, the computing system can extract one or more images. In particular, the computing system can extract one or more images from at least one particular product-related email. Even more particularly, the at least one particular product-related email can be selected based at least in part on the score of the product-related emails.

At 608, the computing system can display the one or more images. In particular, the one or more images can be displayed in at least one email preview. Even more particularly, the at least one email preview can be associated with the at least one particular product-related email.

Figure 7:
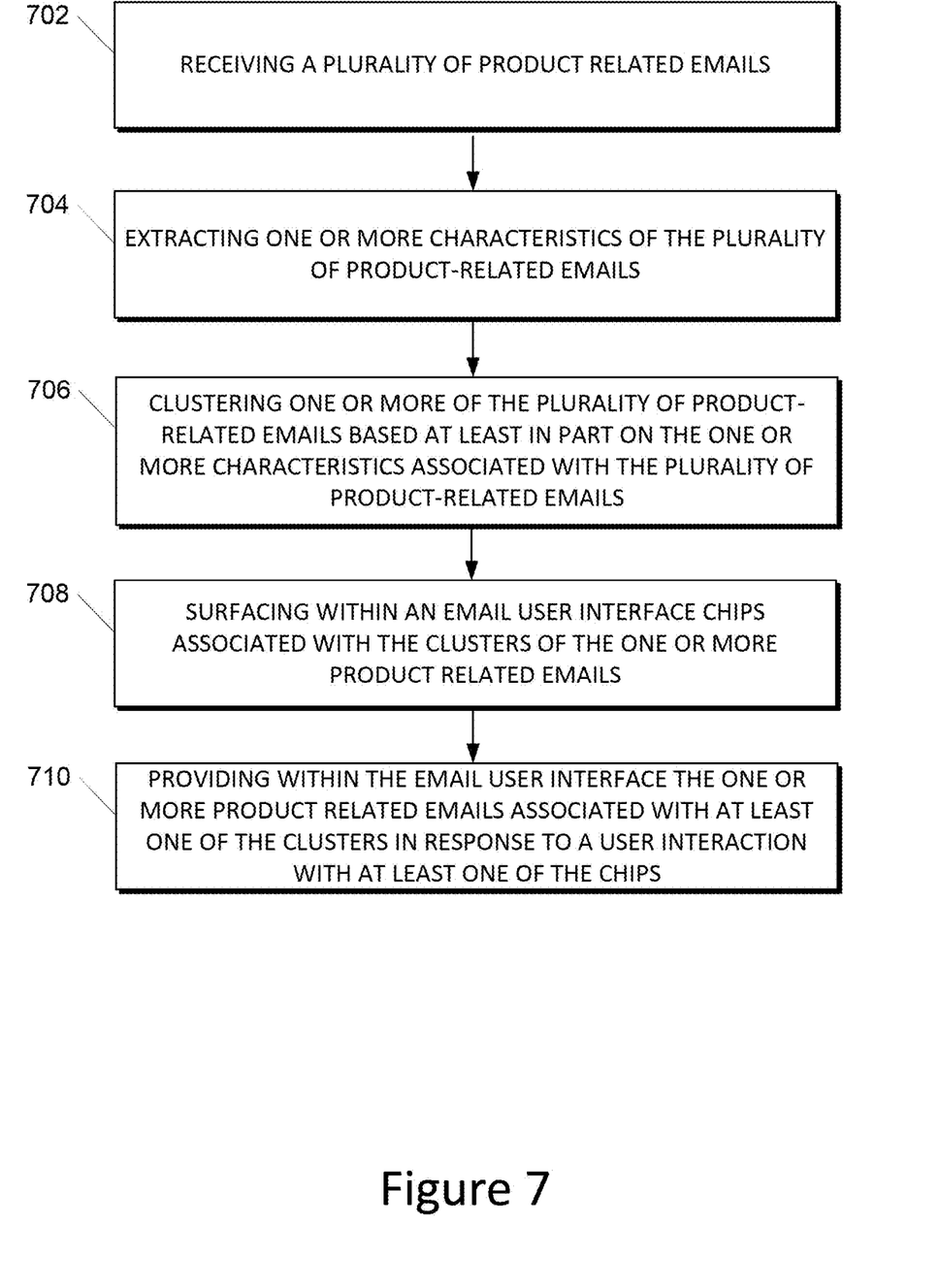
FIG. 7 depicts a flow diagram for providing email filter chips according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can receive a plurality of product-related emails.

At 704, the computing system can extract one or more characteristics. In particular, the one or more characteristics can be associated with one or more of the plurality of product-related emails.

At 706, the computing system can cluster one or more of the plurality of product-related emails. In particular, the computing system can cluster the one or more of the plurality of product-related emails based at least in part on the one or more characteristics. Even more particularly, the one or more characteristics can be associated with the plurality of product-related emails.

At 708, the computing system can surface chips. In particular, the computing system can surface chips within an email user interface. Even more particularly, the computing system can surface chips within an email user interface associated with the clusters of the one or more product-related emails.

At 710, the computing system can display within the email user interface, the one or more product-related emails. In particular, the one or more product-related emails can be associated with at least one of the clusters. Even more particularly, the one or more product-related emails can be associated with at least one of the clusters in response to a user interaction with at least one of the chips.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for organizing product-related emails, the method comprising:

receiving, by a computing system comprising one or more computing devices, a plurality of product-related emails for display in an email application, each product-related email of the plurality of product-related emails comprising one or more images of one or more products associated with the product-related email;

determining, by the computing system, a user preference of the one or more products associated with the product-related emails based at least in part on historical user data related to a likelihood of the user being interested in the one or more products associated with the product-related emails;

generating, by the computing system, a score for each of the product-related emails based at least in part on the user preference;

ranking, by the computing system, the product-related emails based on the score for each of the product-related emails;

extracting, by the computing system, one or more images from at least one particular product-related email, wherein the at least one particular product-related email is selected based at least in part on the ranking; and automatically updating, by the computing system, a displayed user interface of the email application to include one or more images in an email preview for the at least one particular product-related email prior to opening the at least one particular product-related email.

2. The computer-implemented method of claim 1, further comprising:

adjusting the one or more images to align with one or more particular parameterizations prior to display.

3. The computer-implemented method of claim 2, wherein: the particular parameterizations include:

a 1:1 image ratio;

a 4:5 image ratio; or a 1.91:1 image ratio.

4. The computer-implemented method of claim 1, wherein extracting one or more images from at least one particular product-related email comprises automatically extracting the one or more images.

5. The computer-implemented method of claim 1, wherein extracting one or more images from at least one particular product-related email comprises extracting the one or more based on manual annotation.

6. The computer-implemented method of claim 1, wherein automatically updating the user interface of the email application to include one or more images in the email preview for the at least one particular product-related email prior to opening the at least one particular product-related email comprises displaying a minimum or a maximum number of images.

7. The computer-implemented method of claim 1, wherein automatically updating the user interface of the email application to include one or more images in the email preview for the at least one particular product-related email prior to opening the at least one particular product-related email displaying the same one or more images in the same at least one email preview associated with the same at least one particular product-related email within a single email visit.

8. The computer-implemented method of claim 1, wherein automatically updating the user interface of the email application to include one or more images in the email preview for the at least one particular product-related email prior to opening the at least one particular product-related email comprises displaying the same one or more images in the same at least one email preview associated with the same at least one particular product-related email within a period of time.

9. The computer-implemented method of claim 1, wherein automatically updating the user interface of the email application to include one or more images in the email preview for the at least one particular product-related email prior to opening the at least one particular product-related email comprises displaying the same one or more images in the same at least one email preview associated with the same at least one particular product-related email indefinitely.

10. The computer-implemented method of claim 1, wherein automatically updating the user interface of the email application to include one or more images in the email review for the at least one particular product-related email prior to opening the at least one particular product-related email is based at least in part on image quality.

11. The computer-implemented method of claim 1, wherein automatically updating the user interface of the email application to include one or more images in the email preview for the at least one particular product-related email prior to opening the at least one particular product-related email is based at least in part on image display density.

* * * * *